(12) United States Patent
Ogihara et al.

(10) Patent No.: US 7,984,238 B2
(45) Date of Patent: Jul. 19, 2011

(54) STORAGE-MANAGEMENT COMPUTER-READABLE STORAGE MEDIUM, APPARATUS, AND METHOD

(75) Inventors: Kazutaka Ogihara, Kawasaki (JP);
Yoshihiro Tsuchiya, Kawasaki (JP);
Masahisa Tamura, Kawasaki (JP);
Tetsutaro Maruyama, Kawasaki (JP);
Kazuichi Oe, Kawasaki (JP); Takashi Watanabe, Kawasaki (JP); Tatsuo Kumano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 535 days.

(21) Appl. No.: 12/219,748

(22) Filed: Jul. 28, 2008

(65) Prior Publication Data

US 2009/0037681 A1    Feb. 5, 2009

(30) Foreign Application Priority Data

Aug. 3, 2007   (JP) ................... 2007-202600

(51) Int. Cl.
*G06F 12/00*   (2006.01)
*G06F 3/06*    (2006.01)
(52) U.S. Cl. .. 711/114; 711/147; 711/162; 711/E12.001
(58) Field of Classification Search ........................ None
See application file for complete search history.

(56) References Cited

FOREIGN PATENT DOCUMENTS

| JP | 04-168522 | 6/1992 |
| JP | 10-254637 | 9/1998 |

OTHER PUBLICATIONS

Japanese Office Action issued Aug. 18, 2009 in corresponding Japanese Patent Application 2007-202600.

*Primary Examiner* — Kevin Verbrugge
(74) *Attorney, Agent, or Firm* — Staas & Halsey LLP

(57) ABSTRACT

A storage-management apparatus and method that manages storage areas. The storage-management apparatus includes a collecting unit that collects valid-area-determination information items, each of which shows whether a corresponding one of the storage areas is a valid or invalid area, and timestamp information items, each of which shows that a corresponding one of the storage areas has been accessed. In accordance with the valid-area-determination information items and the timestamp information items, data from a storage area which is selected from among valid areas and whose timestamp information item is oldest is copied to a storage area which is selected from among invalid areas and whose timestamp information item is oldest, and timestamp information items and valid-area-determination information items concerning the storage area from which the data is copied and concerning the storage area to which the data is copied is updated.

13 Claims, 11 Drawing Sheets

FIG. 6

SLICE-MANAGEMENT-INFORMATION TABLE OF DP#0

[000,P,LVOLA-1,DP#2-001,t000]
[001,F,NONE, NONE,t100]
[002,P,LVOLA-5,DP#3-000,t200]
[003,S,LVOLA-4,DP#1-003,t300]
[004,F,NONE, NONE,t400]
[005,P,LVOLA-6,DP#1-004,t500]

SLICE-MANAGEMENT-INFORMATION TABLE OF DP#1

[000,F,NONE, NONE,t000]
[001,F,NONE, NONE,t100]
[002,S,LVOLA-3,DP#2-002,t200]
[003,P,LVOLA-4,DP#0-003,t300]
[004,S,LVOLA-6,DP#0-005,t400]
[005,F,NONE, NONE,t500]

SLICE-MANAGEMENT-INFORMATION TABLE OF DP#2

[000,F,NONE, NONE,t000]
[001,S,LVOLA-1,DP#0-000,t100]
[002,P,LVOLA-3,DP#1-002,t200]
[003,F,NONE, NONE,t300]
[004,F,NONE, NONE,t400]
[005,S,LVOLA-2,DP#3-005,t500]

SLICE-MANAGEMENT-INFORMATION TABLE OF DP#3

[000,S,LVOLA-5,DP#0-002,t000]
[001,F,NONE, NONE,t100]
[002,F,NONE, NONE,t200]
[003,F,NONE, NONE,t300]
[004,F,NONE, NONE,t400]
[005,P,LVOLA-2,DP#2-005,t500]

US 7,984,238 B2

STORAGE-MANAGEMENT COMPUTER-READABLE STORAGE MEDIUM, APPARATUS, AND METHOD

CROSS-REFERENCE TO RELATED APPLICATIONS

This application is based upon and claims the benefit of priority from the prior Japanese Patent Application No. 2007-202600 filed on Aug. 3, 2007, the entire contents of which are incorporated herein by reference.

BACKGROUND

1. Field of the Invention

The present invention relates to storage management, in which patrol operations are performed on slices (storage areas) in accordance with sequence numbers of patrol operations that are assigned to the slices.

SUMMARY

The disclosed storage-management apparatus and method manages a plurality of storage areas. The storage-management apparatus includes a collecting unit configured to collect valid-area-determination information items and timestamp information items, each of the valid-area-determination information items showing whether a corresponding one of the plurality of storage areas is one of valid areas in which data is stored or one of invalid areas in which data is not stored, each of the timestamp information items showing that an entire or whole of a corresponding one of the plurality of storage areas has been accessed. The storage-management apparatus includes a data-copy unit configured to copy, in accordance with the valid-area-determination information items and the timestamp information items concerning the plurality of storage areas that are collected, data from a storage area which is selected from among the valid areas and whose timestamp information item is the oldest to a storage area which is selected from among the invalid areas and whose timestamp information item is the oldest.

The data-copy unit is configured to update a timestamp information item concerning the storage area from which the data is copied and a timestamp information item concerning the storage area to which the data is copied, update a valid-area-determination information item concerning the storage area from which the data is copied to an information item showing that the storage area is an invalid area, and update a valid-area-determination information item concerning the storage area to which the data is copied to an information item showing that the storage area is a valid area.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 illustrates slice-management-information tables according to an embodiment;

DETAILED DESCRIPTION OF THE PREFERRED EMBODIMENTS

Figure 1:
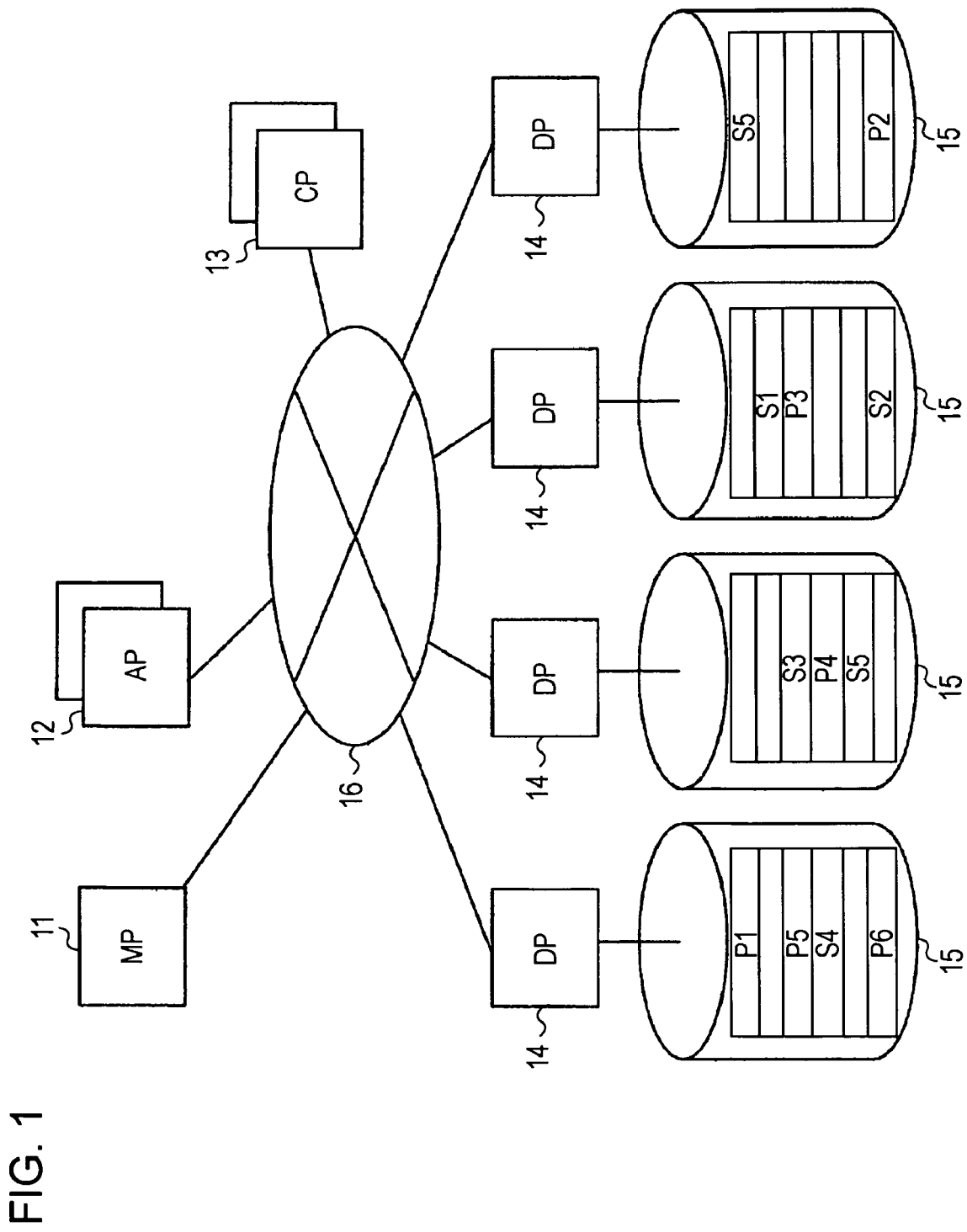
FIG. 1 is a block diagram illustrating a configuration of an organic storage according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

The technical premise of the invention includes an outline of an organic storage that is a network storage including a plurality of control devices which operate independent of one another.

FIG. 1 is a block diagram of a configuration of an organic storage according to an embodiment of the present invention, showing an exemplary configuration. The organic storage includes a management processor (MP) 11, an access processor (AP) 12, a CP 13, DPs 14, disks 15, and a network 16. Each of the MP 11, the AP 12, the CP 13, and the DPs 14 may be implemented by one or more computers. The MP 11, the AP 12, the CP 13, and the DPs 14 are connected to one another via the network 16. Each of the disks 15 is connected to a corresponding one of the DPs 14. A plurality of disks 15 may be connected to each of the DPs 14.

The MP 11 is a computer with which an administrator issues a management command for the organic storage. The AP 12 is a computer that receives a request from a user, and that transfers the request to the DPs 14. The user accesses a logical volume of the AP 12 to make a request to the organic storage. The CP 13 performs management of the logical volume, and monitors states of the DPs 14. The DPs 14 receive and process data-write requests or data-read requests that are sent from the AP 12. Furthermore, in order to make or recover a data-redundancy configuration, the DPs 14 performs operation(s) including sending and receiving of data among the DPs 14.

The logical volume is managed in such a manner that it is divided into segments having a fixed size (for example, 1 GB). Additionally, each of the DPs 14 manages a corresponding one of the disks 15, which are connected to the DPs 14, in such a manner that the disk 15 is divided into slices (storage areas) having a size the same as that of the segments. All of the segments have the data-redundancy configuration, and pairs of slices are assigned to the segments. There are a number of types of slices, such as primary slices, secondary slices, and other slices. From among data items of the segments having the data-redundancy configuration, the main data items are stored in primary slices, and sub-data items are stored in secondary slices.

In this example, each of the disks 15 has six slices. P1, P2, P3, P4, P5, and P6 denote primary slices. S1, S2, S3, S4, S5, and S6 denote secondary slices. A number that is attached to each primary slice or each secondary slice indicates a segment number. The data-redundancy configuration is realized using a primary slice and a secondary slice that have the same segment number, such as "P1" and "S1".

Each of the DPs 14 has a metadata item that is associated with the logical volume and corresponding slices. The CP 13 collects metadata items from all of the DPs 14, and retains the metadata items. In a case of a change of the logical volume, or in a case in which a malfunction is detected in the DPs 14, the CP 13 sends an instruction for modifying metadata items to related ones of the DPs 14. The AP 12 refers to the CP 13 to obtain the logical volume information, and sends data-write requests or data-read requests to the DPs 14 in accordance with the logical volume information.

When a data item is written, a computer of the user sends a data-write request and the data item to the AP 12. The AP 12 divides the data item into predetermined units, and sends the data-write request to one of the DPs 14. The DP 14 that has received the data-write request determines, using the logical volume information, which one of the DPs 14 is paired with the DP 14 to have the data-redundancy configuration, and sends the data-write request to the determined DP 14. The DP 14 that has received the data-write request from the AP 12 is referred to as a primary DP, and the DP 14 that has received the data-write request from the primary DP is referred to as a secondary DP.

The secondary DP, which has received the data-write request, performs scheduling of writing of the data item into a corresponding disk 15 that is managed by the secondary DP, and sends back a response to the primary DP. The primary DP, which has received the response from the secondary DP, performs scheduling of writing of the data item into a corresponding disk 15 that is managed by the secondary DP, and sends back a response to the AP 12. The AP 12, which has received the response from the primary DP, sends back a response to the computer with which the user has issued the data-writing request.

When a data item is read, the computer of the user sends a data-read request to the AP 12. The AP 12 sends the data-read request to a DP 14 in which the data item is written as the main data item. The DP 14 that has received the data-read request from the AP 12 reads the data item from a corresponding disk 15 that is managed by the DP 14, and sends the data item to the AP 12. The AP 12, which has received the data item, performs data assembly, and sends the assembled data to the computer of the user.

Furthermore, when a new DP 14 in which setting has finished is incorporated into the network 16, the new DP 14 sends existence information to the CP 13. The CP 13, which has received the existence information, refers to the new DP 14, which has been added, for logical volume information. The new DP 14 sends the logical volume information that is managed by the new DP 14 to the CP 13. The CP 13 incorporates the logical volume information that has been sent from the new DP 14 into the logical volume information that is managed by the CP 13. Accordingly, a corresponding disk 15 that is managed by the new DP 14 can be utilized as one portion of the logical volume of the organic storage.

Furthermore, when the administrator causes the MP 11 to execute a management command for separating any one of the DPs 14 from the network 16, data is copied in order not to lose the data-redundancy configuration. The CP 13 calculates the amount of free disk space of the entire system. The CP 13 instructs the DP 14 that is to be separated and the other DPs 14 to copy a data item in such a manner that the same DP 14 does not have both the data item and a copied data item. When a process of copying the data item and recovery of the data-redundancy configuration are completed, the DP 14 can be separated from the network 16.

Because maintenance such as an addition of a DP 14 or a replacement of a DP 14 is performed, the usage amounts of the DPs 14 become imbalanced. In such a case, access is concentrated on a particular DP 14 due to the imbalance, resulting in a performance decrease of the organic storage. Additionally, in such a case, when a DP 14 malfunctions, it is difficult to recover the data-redundancy configuration. In order to deal with the imbalance, a data-rearrangement function of equalizing the usage amounts of the DPs 14 is provided. When the administrator causes the AP 12 to execute a data-rearrangement command, the CP 13 refers to the DPs 14 for the usage amounts of the DPs 14, and instructs the DPs 14 to move data items so that the usage amounts of the DPs 14 can be equalized.

Furthermore, when a DP 14 malfunctions, the data-redundancy configuration is lost. In such a case, the organic storage automatically performs recovery of the data-redundancy configuration, whereby the data-redundancy configuration is recovered. The CP 13 performs heartbeat communications with all of the DPs 14. When a heartbeat communication is stopped or when the CP 13 receives a heartbeat communication including error information, the CP 13 detects a malfunction of a DP 14.

When the CP 13 determines that a certain DP 14 has malfunctioned, the CP 13 determines, using the logical volume information that is maintained in the CP 13, which data item needs to be copied to recover the data-redundancy configuration. Then, the CP 13 prepares a free disk space that is necessary for the recovery of the data-redundancy configuration in another DP 14. Next, the CP 13 instructs a DP 14 having the data item for which no redundant data item exists and the DP 14 having the free disk space to copy the data item from the DP 14 having the data item for which no redundant data item exists to the DP 14 having the free disk space. The DPs 14 that have been instructed copy the data item in accordance with the instruction. Data-redundancy information is reconfigured, and the recovery of the data-redundancy configuration is finished.

Additionally, there is a probability that a block becomes a bad block on one of the disks 15. For this reason, the organic storage performs a patrol operation on each slice. Sequence numbers of patrol operations are assigned in advance to all of the slices. In accordance with the sequence numbers, patrol operations are performed on all of the slices.

However, because data items are moved among the slices in the organic storage according to the above-described technical premise, in a case in which the patrol operations are performed on the slices in accordance with the sequence numbers that are fixed as described above, a time from when a patrol operation is performed to when another patrol operation is performed for the next time varies among data items. The longer the time intervals of the patrol operations, the higher the probability that a data item is exposed to a risk. It is desirable that the data items be prevented from being left without being subjected to a patrol operation for a long period of time.

Furthermore, in the patrol operations performed in the above-described organic storage, a process of reading data items from primary and secondary slices and comparing the data items with each other is performed. For this reason, when a data item is read from the primary slice that is subjected to a patrol operation, performance degradation occurs.

The detailed embodiments of the present invention are described below with reference to the accompanying drawings.

First, a configuration of an organic storage according to an embodiment is described.

Figure 2:
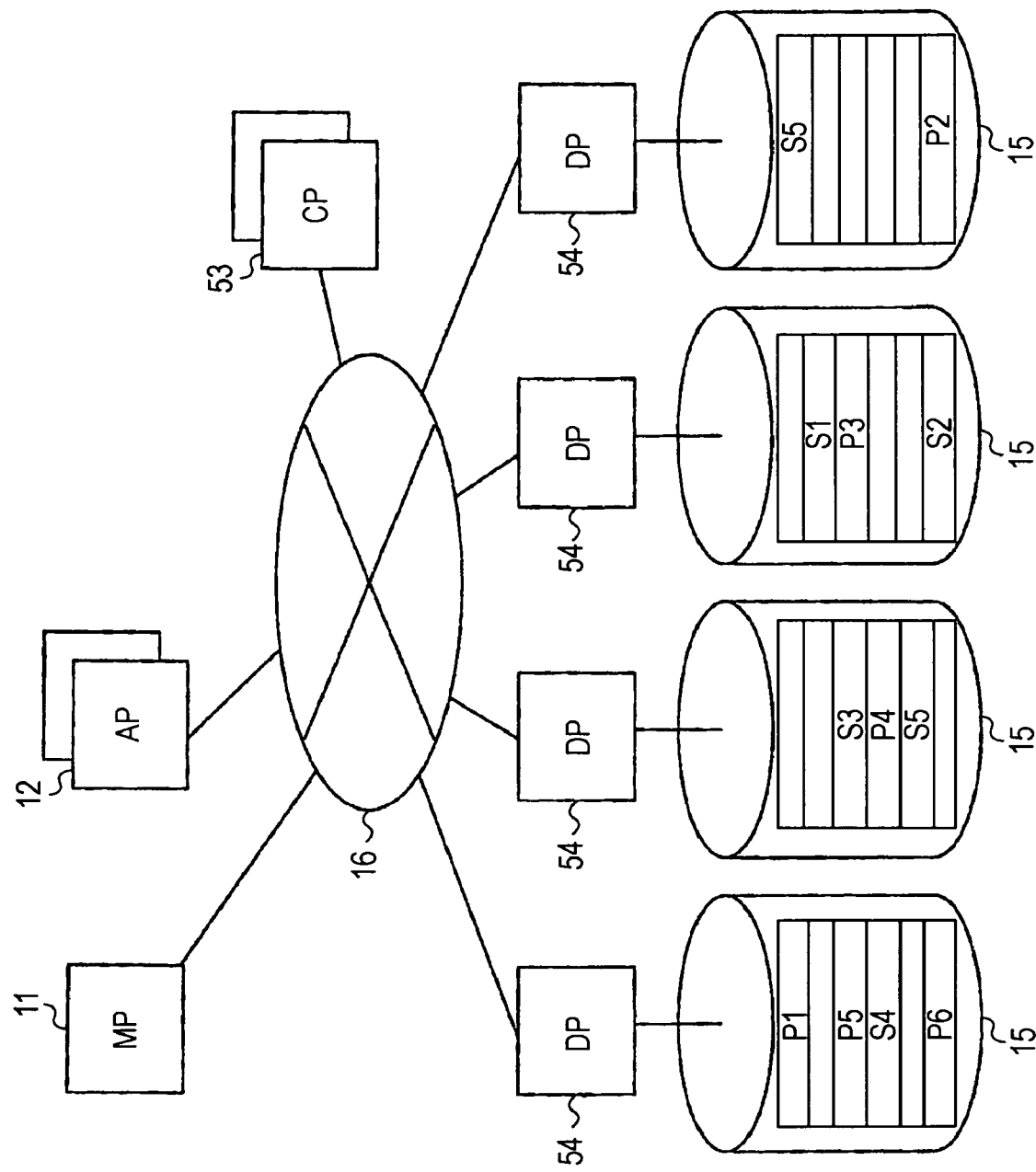
FIG. 2 is a block diagram illustrating a configuration of an organic storage according to an embodiment.

FIG. 2 is a block diagram of a configuration of the organic storage according to the embodiment, showing the configuration as an example. In FIG. 1, reference numerals the same as those used in FIG. 1 denote elements the same as or equivalent to those shown in FIG. 1, and the description thereof is omitted. Compared with the organic storage shown in FIG. 1, the organic storage includes a CP 53 (a storage-management device) instead of the CP 13, and DPs 54 instead of the DPs 14. The organic storage having the storage-management device may be implemented using one or more computers having processor(s), a specialized terminal, or any other machine communicatively coupled to a storage.

Figure 3:
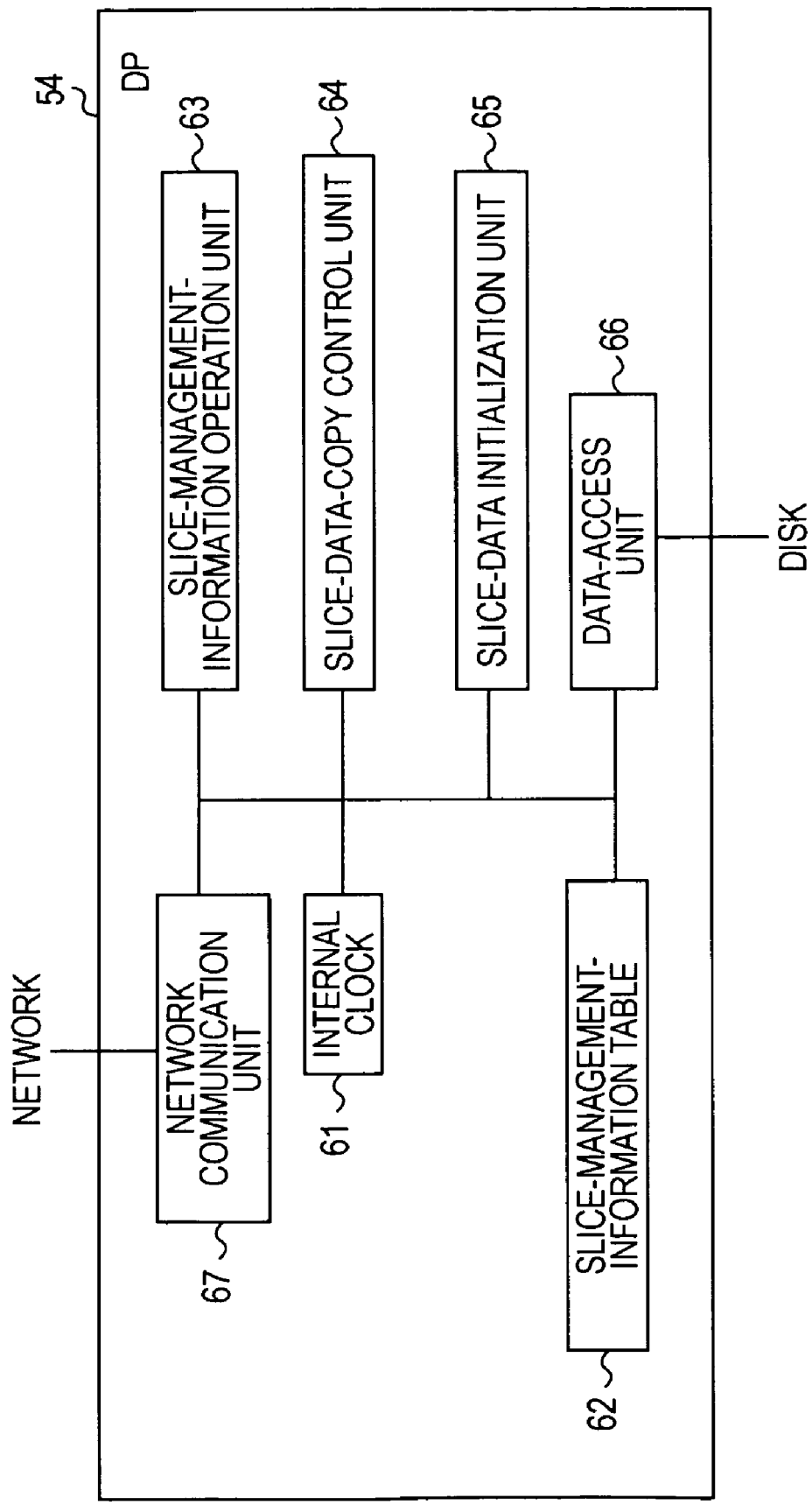
FIG. 3 is a block diagram illustrating a configuration of a data processor (DP) according to an embodiment.

FIG. 3 is a block diagram of a configuration of each of the DPs according to an embodiment, showing the configuration as an example. Each of the DPs 54 includes an internal clock 61, a slice-management-information table 62, a slice-management-information operation unit 63, a slice-data-copy control unit 64, a slice-data initialization unit 65, a data-access unit 66, and a network communication unit 67.

The internal clock 61 manages time for the node (the DP 54) to which it belongs. The slice-management-information table 62 stores a slice-management information item concerning the node. The slice-management-information operation unit 63 refers to or updates the slice-management information item in accordance with an instruction issued by the node or the network 16. The slice-data-copy control unit 64 copies an entire data item of a slice to another slice in accordance with an instruction issued by the node or the network 16. The slice-data initialization unit 65 initializes the entire data item of a slice. The data-access unit 66 controls access to a corresponding disk 15 managed by the node. The network communication unit 67 is connected to the network 16, and communicates with other nodes.

Figure 4:
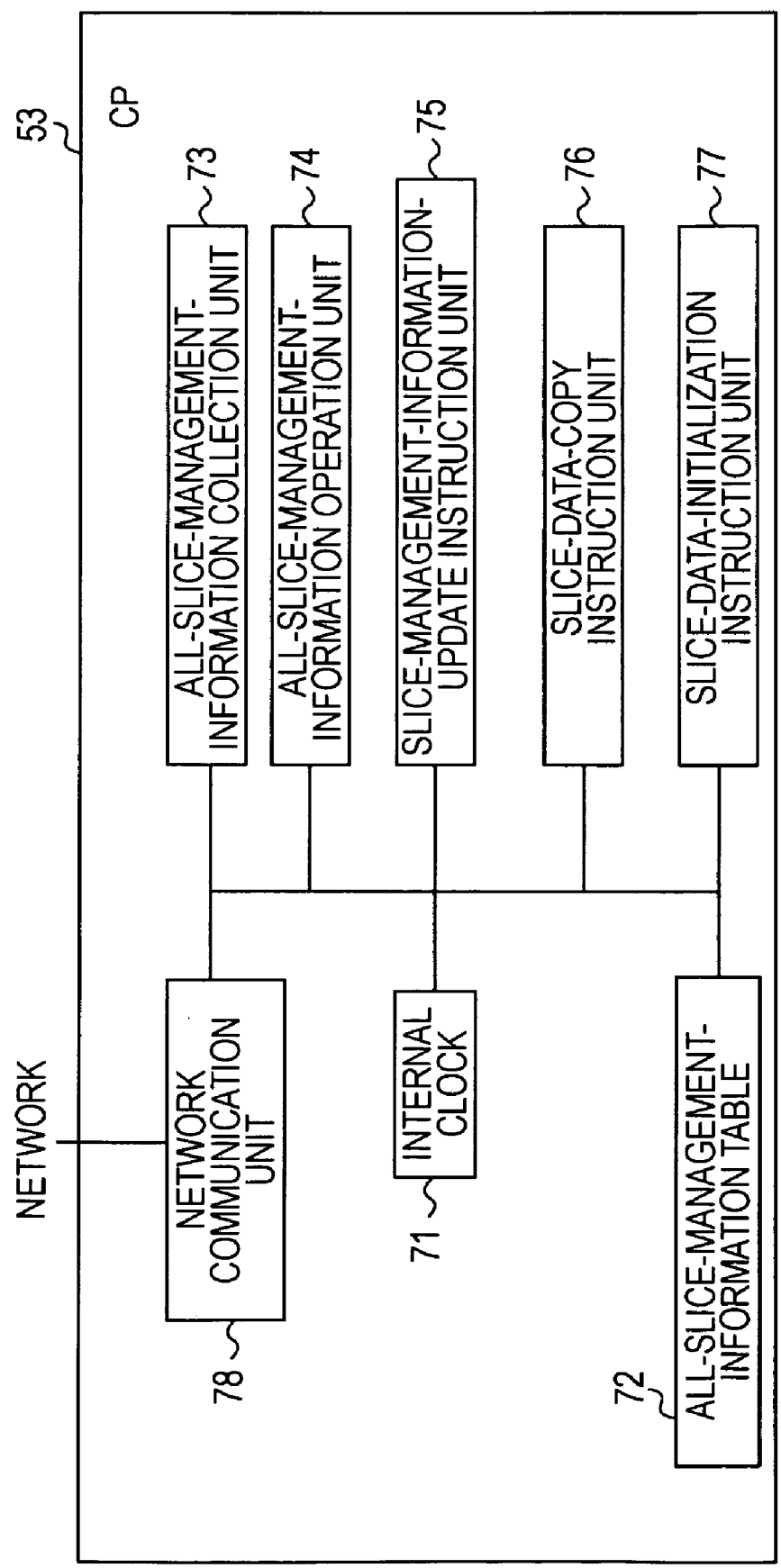
FIG. 4 is a block diagram illustrating a configuration of a control processor (CP) according to an embodiment.

FIG. 4 is a block diagram of a configuration of the CP according to an embodiment, showing the configuration as an example. The CP 53 includes an internal clock 71, an all-slice-management-information table 72, an all-slice-management-information collection unit 73, an all-slice-management-information operation unit 74, a slice-management-information-update instruction unit 75, a slice-data-copy instruction unit 76, a slice-data-initialization instruction unit 77, and a network communication unit 78.

The internal clock 71 manages time for the node to which it belongs. The all-slice-management-information table 72 stores slice-management information items managed by all of the DPs 54. The all-slice-management-information collection unit 73 collects the slice-management information items from all of the DPs 54. The all-slice-management-information operation unit 74 performs various operations on the basis of data stored in the all-slice-management-information table 72. The slice-management-information-update instruction unit 75 instructs the DPs 54 to update the slice-management-information items. The slice-data-copy instruction unit 76 issues an instruction for updating data of a specified slice. The slice-data-initialization instruction unit 77 issues a slice-data-initialization instruction for a specified slice. The network communication unit 78 is connected to the network 16, and communicates with other nodes.

Next, the contents of the slice-management information items are described.

Each of the slice-management information items includes a slice identification (ID) value, a FLAG value, an LVOL-info value, a Pair-info value, a timestamp, and an attr value for a corresponding slice.

A slice ID is an ID of the slice. As FLAG, the slice has a value denoted by any one of P (primary), S (secondary), F (free), and D (dirty). P (primary) denotes a primary slice, and S (secondary) denotes a secondary slice. F (free) denotes an initialized slice, i.e., a slice that is initialized by writing an initialization value into the entire slice. D (dirty) denotes a slice, although having become a primary or secondary slice by writing certain data in the slice after initialization, that is neither a primary slice nor a secondary slice after a subsequent operation has been performed. A slice in which valid data exists, such as the primary slice and the secondary slice, is referred to as a valid slice (area). A slice in which valid data does not exist, such as the free slice and the dirty slice, is referred to as an invalid slice (area).

LVOL-info concerns logical volume information associated with the slice, and, for example, includes an identifier of the logical volume information and a segment ID. Pair-info concerns the other slice that is paired with the slice for the same segment, and, for example, includes the number of a DP 54 to which the other slice belongs and a slice ID of the other slice. The timestamp shows a time at which access to the entire slice is performed. Attr includes other attributes.

The timestamp is updated at a time at which access to the entire slice is completed, such as a time at which slice initialization is completed, a time at which data is read from the entire slice, a time at which data is written into the entire slice, or a time at which copying of slice data is completed. Because checking of the slice is simultaneously performed when data is read or written, access to the entire slice is equivalent to performance of a patrol operation on the slice.

Figure 5:
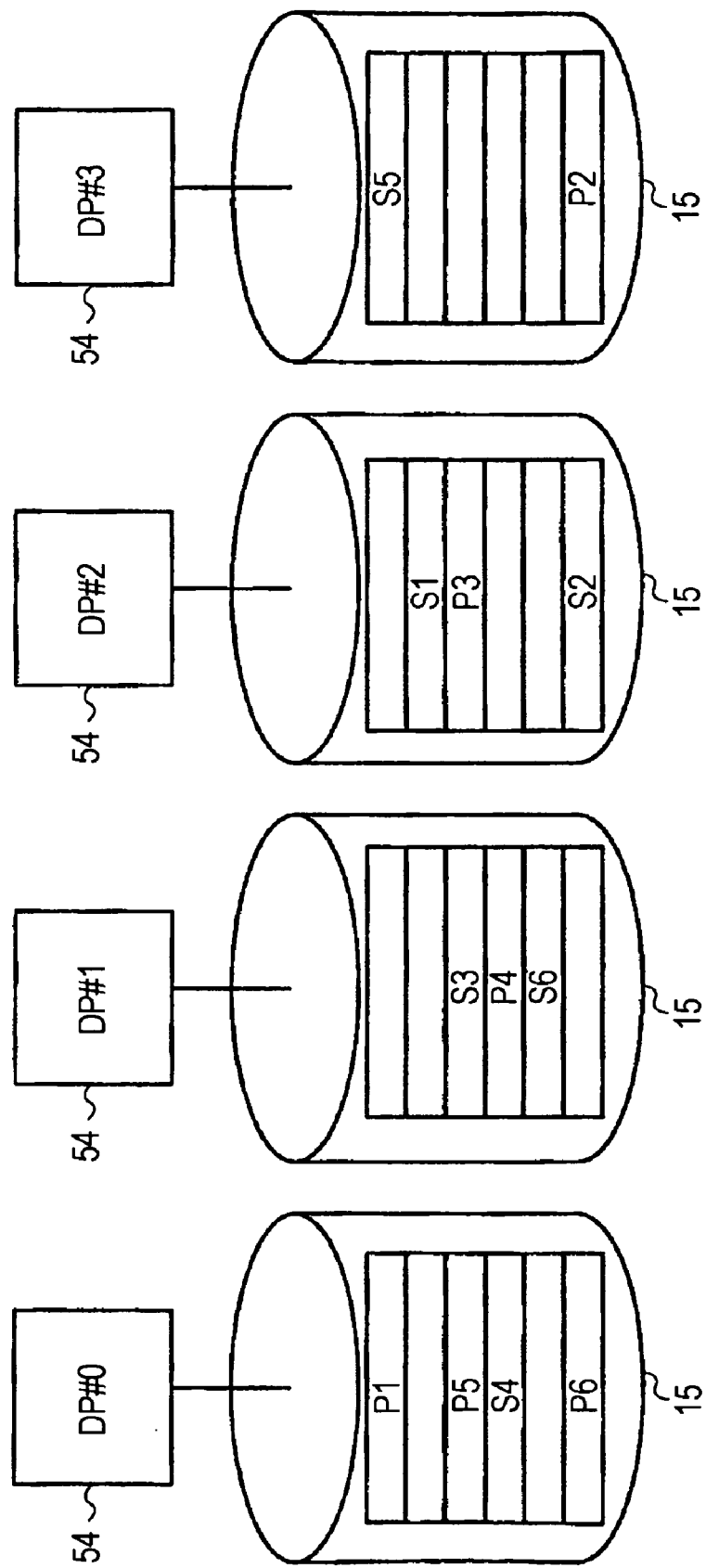
FIG. 5 is a diagram showing slice-management information items according to an embodiment.

FIG. 5 is a conceptual diagram showing the slice-management information items according to an embodiment as examples. In this example, there are four DPs 54, namely, DP#0, DP#1, DP#2, and DP#3. Additionally, each of the DPs 54 manages six slices, namely, 000, 001, 002, 003, 004, and 005, which are denoted in order of slices from the top one. There is one logical volume, and an identifier of the logical volume is denoted by LVOLA. The logical volume includes six segments, and segment IDs of the segments are denoted by 1, 2, 3, 4, 5 and 6. In correspondence with the segment IDs, primary slices are denoted by P1, P2, P3, P4, P5, and P6, and secondary slices are denoted by S1, S2, S3, S4, S5, and S6.

FIG. 6 includes slice-management-information tables according to an embodiment, showing the tables as examples. In this example, slice-management-information tables of DP#0, DP#1, DP#2, and DP#3 are shown. Additionally, timestamps are denoted by t000, t100, t200, t300, t400, and t500.

Next, a patrol process is described.

As settings for the patrol process, a setting in a case in which timestamp is assigned the highest priority, and a setting in a case in which data protection is assigned a higher priority are described.

A patrol process in a case in which timestamp is assigned the highest priority is described.

Figure 7:
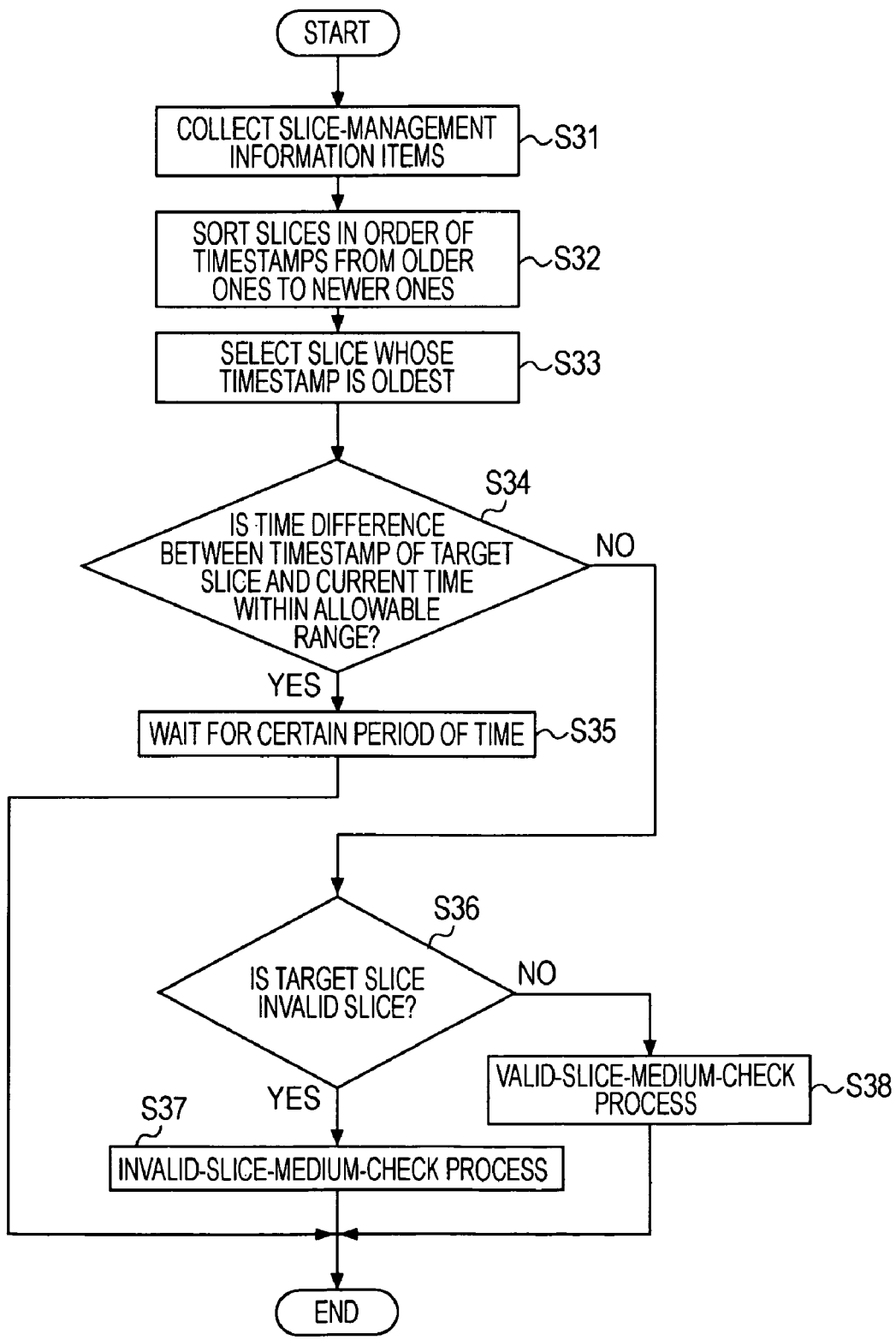
FIG. 7 is a flowchart illustrating a patrol process performed by the CP according to an embodiment in a case in which a timestamp is assigned a highest priority.

FIG. 7 is a flowchart of the patrol process performed by the CP according to an embodiment in a case in which timestamp is assigned the highest priority, showing the patrol process as an example. First, the all-slice-management-information collection unit 73 collects slice-management information items from all of the DPs 54 (S31). Next, the all-slice-management-information operation unit 74 sorts slices in order of timestamps from older ones to newer ones (S32). A slice whose timestamp is the oldest is selected from among all of the slices as a target slice (S33). Then, the all-slice-management-information operation unit 74 determines whether or not a time difference between the timestamp of the target slice and a current time is within a predetermined allowable range (S34).

When the time difference is within the allowable range (Yes in S34), the all-slice-management-information operation unit 74 waits for a certain period of time (S35), and the patrol process ends. In other words, in a case in which sufficient (predetermined) time has not elapsed after the previous patrol process (including when access to the entire slice) was performed on the target slice, a patrol process is not to be immediately started.

When the time difference is not within the allowable range (No in S34), the all-slice-management-information operation unit 74 determines whether the target slice is an invalid slice (a free or dirty slice) or not (S36).

When the target slice is an invalid slice (Yes in S36), an invalid-slice-medium-check process is performed on the target slice (S37), and the patrol process ends.

When the target slice is not an invalid slice (No in S36), a valid-slice-medium-check process is performed on the target slice (S38), and the patrol process ends.

Next, the invalid-slice-medium-check process is described.

Figure 8:
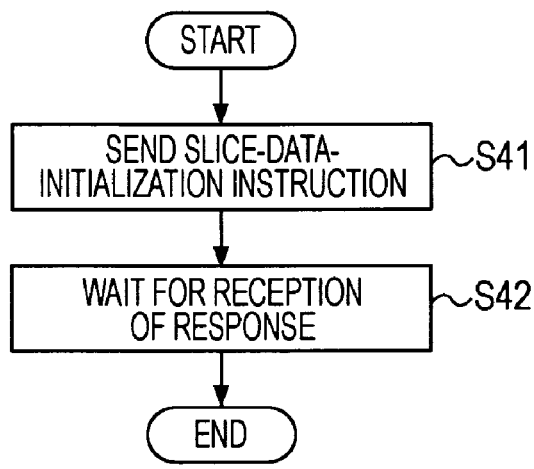
FIG. 8 is a flowchart illustrating an invalid-slice-medium-check process performed by the CP according to an embodiment.

FIG. 8 is a flowchart of an invalid-slice-medium-check process performed by the CP according to an embodiment, showing the invalid-slice-medium-check process as an example. First, the slice-data-initialization instruction unit 77 sends a slice-data-initialization instruction to a DP 54 that manages the target slice (S41), and waits for reception of a response from the DP 54 (S42). When the slice-data-initialization instruction unit 77 receives the response, the invalid-slice-medium-check process ends.

Figure 9:
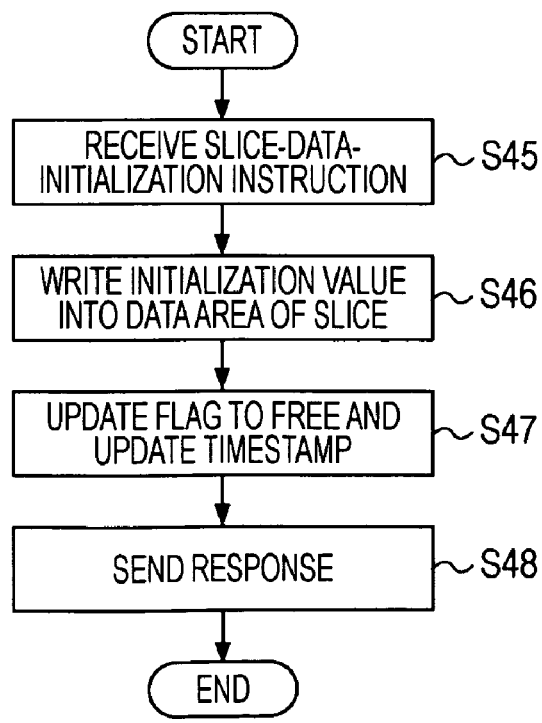
FIG. 9 is a flowchart illustrating an invalid-slice-medium-check process performed by the DP according to an embodiment.

FIG. 9 is a flowchart of an invalid-slice-medium-check process performed by a DP according to an embodiment, showing the invalid-slice-medium-check process as an example. First, a slice-data initialization unit 65 receives the slice-data-initialization instruction including a slice ID of the target slice from the CP 53 (S45). The slice-data initialization unit 65 writes an initialization value into a data area of the target slice. Next, a slice-management-information operation unit 63 updates a corresponding FLAG to free in a slice-management information item concerning the target slice, and also updates a timestamp in the slice-management information item (S47). Then, a network communication unit 67 sends back a response to the CP 53 (S48), and the invalid-slice-medium-check process ends. After that, the CP 53 starts the patrol process again.

Next, the valid-slice-medium-check process is described.

Figure 10:
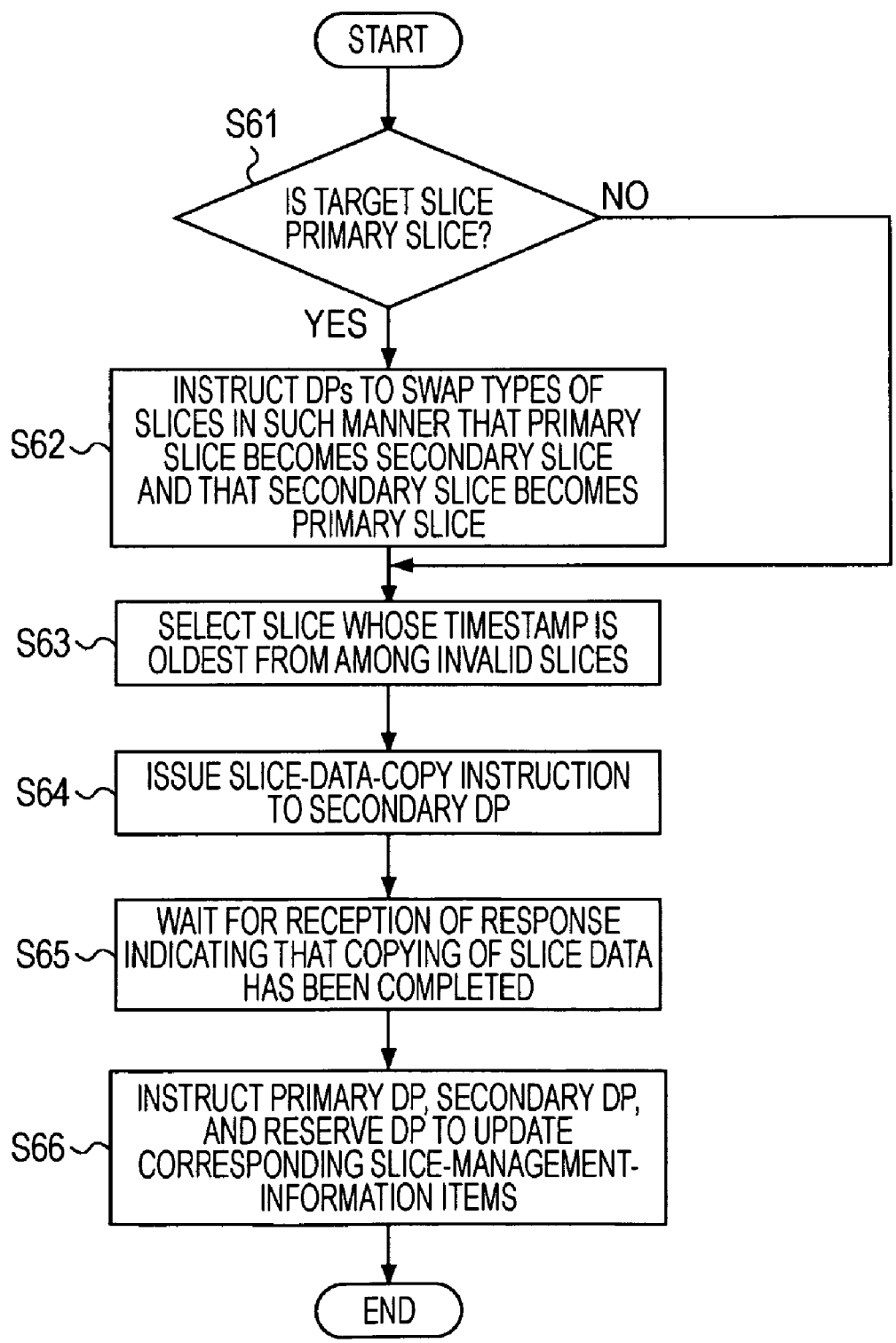
FIG. 10 is a flowchart illustrating a valid-slice-medium-check process performed by the CP according to an embodiment.

FIG. 10 is a flowchart of a valid-slice-medium-check process performed by the CP according to an embodiment, showing the valid-slice-medium-check process as an example. First, the all-slice-management-information operation unit 74 determines whether the target slice is a primary slice or not (S61).

When determining that the target slice is not a primary slice (No in S61), the valid-slice-medium-check process proceeds to S63. In contrast, when determining that the target slice is a primary slice (Yes in S61), the slice-management-information-update instruction unit 75 instructs a DP 54 having the primary slice and a DP 54 having a secondary slice that is paired with the primary slice to swap the types of slices in such a manner that the primary slice becomes the secondary slice and that the secondary slice becomes the primary slice (S62).

Next, the all-slice-management-information operation unit 74 selects a slice whose timestamp is the oldest as a reserve slice from among invalid slices (S63). The DP 54 that manages the primary slice is referred to as a primary DP. The DP 54 that manages the secondary slice is referred to as a secondary DP. A DP 54 that manages the reserve slice is referred to as a reserve DP.

Then, the slice-data-copy instruction unit 76 issues a slice-data-copy instruction to the secondary DP (S64). The slice-data-copy instruction is an instruction for copying a data item of the secondary slice, which is a slice from which the data item is to be copied, to the reserve slice, which is a slice to which the data item is to be copied. Next, the slice-data-copy instruction unit 76 waits for a response indicating that copying of the data item of the secondary slice is completed from the secondary DP (S65). After that, the slice-management-information-update instruction unit 75 instructs the secondary DP to update a slice-management information item concerning the secondary slice so that the slice-management information item shows that the secondary slice became a dirty slice. The slice-management-information-update instruction unit 75 instructs the reserve DP to update a slice-management information item concerning the reserve slice so that the slice-management information item shows that the reserve slice became the secondary slice. The slice-management-information-update instruction unit 75 instructs the primary DP to update a slice-management information item concerning the secondary slice (S66). The valid-slice-medium-check process ends.

Figure 11:
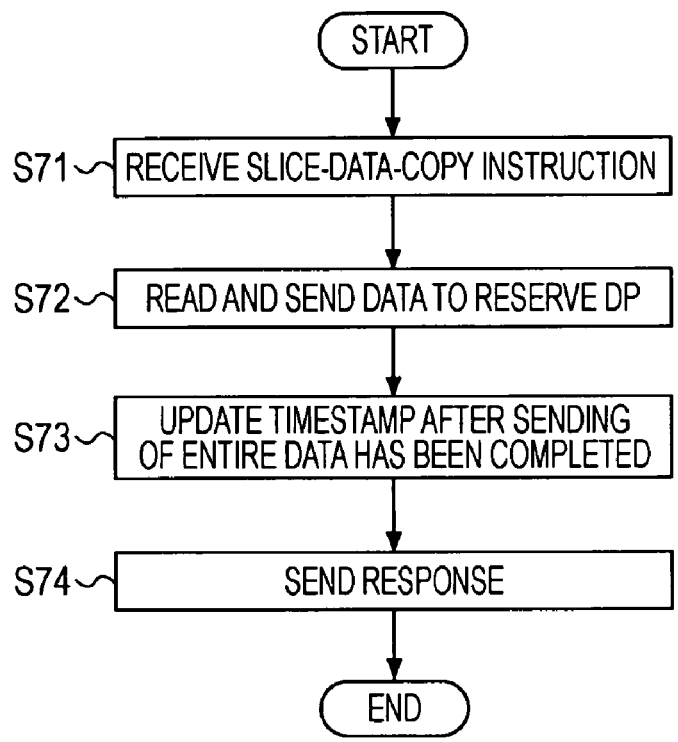
FIG. 11 is a flowchart illustrating a slice-data-copy process performed by a secondary DP according to an embodiment.

FIG. 11 is a flowchart of a slice-data-copy process performed by the secondary DP according to an embodiment, showing the slice-data-copy process as an example. First, in the secondary DP, a slice-data-copy control unit 64 receives, from the CP 53, the slice-data-copy instruction including a specification of the slice from which the data item is to be copied, and a specification of the slice to which the data item is to be copied (S71). Next, the slice-data-copy control unit 64 reads the data item from the specified slice from which the data item is to be copied, and sends the data item to the reserve DP (S72). After sending of the entire data item is completed, a timestamp of the slice from which the data item is copied is updated (S73), and sends a response to the slice-data-copy instruction to the CP 53 (S74). The slice-data-copy process ends.

Figure 12:
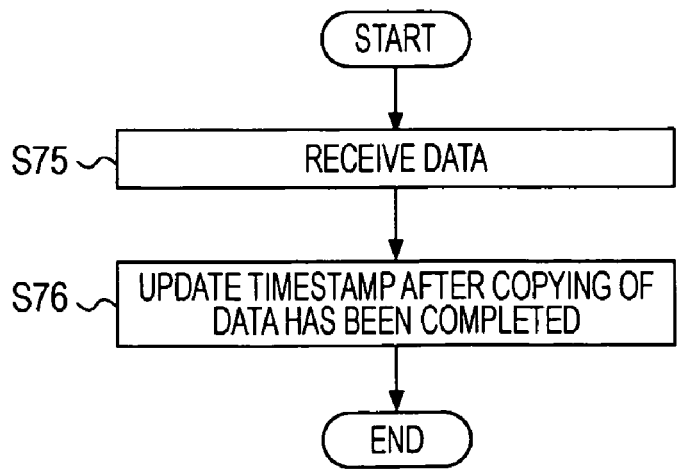
FIG. 12 is a flowchart illustrating a slice-data-copy process performed by a reserve DP according to an embodiment.

FIG. 12 is a flowchart of a slice-data-copy process performed by the reserve DP according to the embodiment, showing the slice-data-copy process as an example. First, in the reserve DP, when a slice-data-copy control unit 64 receives the data item that has been sent from the secondary DP, the slice-data-copy control unit 64 copies the data item into the slice to which the data item is to be copied (S75). After copying of the entire data item to the slice is completed, a timestamp of the slice to which the data item is copied is updated (S76). The slice-data-copy process ends.

In the patrol process in a case in which timestamp is assigned the highest priority, regardless of whether the target slice is a valid slice or an invalid slice, a slice whose timestamp is the oldest is selected as the target slice from among all of the slices. Accordingly, time intervals of patrol processes can be continuously equalized for all of the slices. In other words, all of the slices can be prevented from being in a state in which no patrol process is performed for a long period time.

Next, a patrol process in a case in which data protection is assigned a higher priority.

Figure 13:
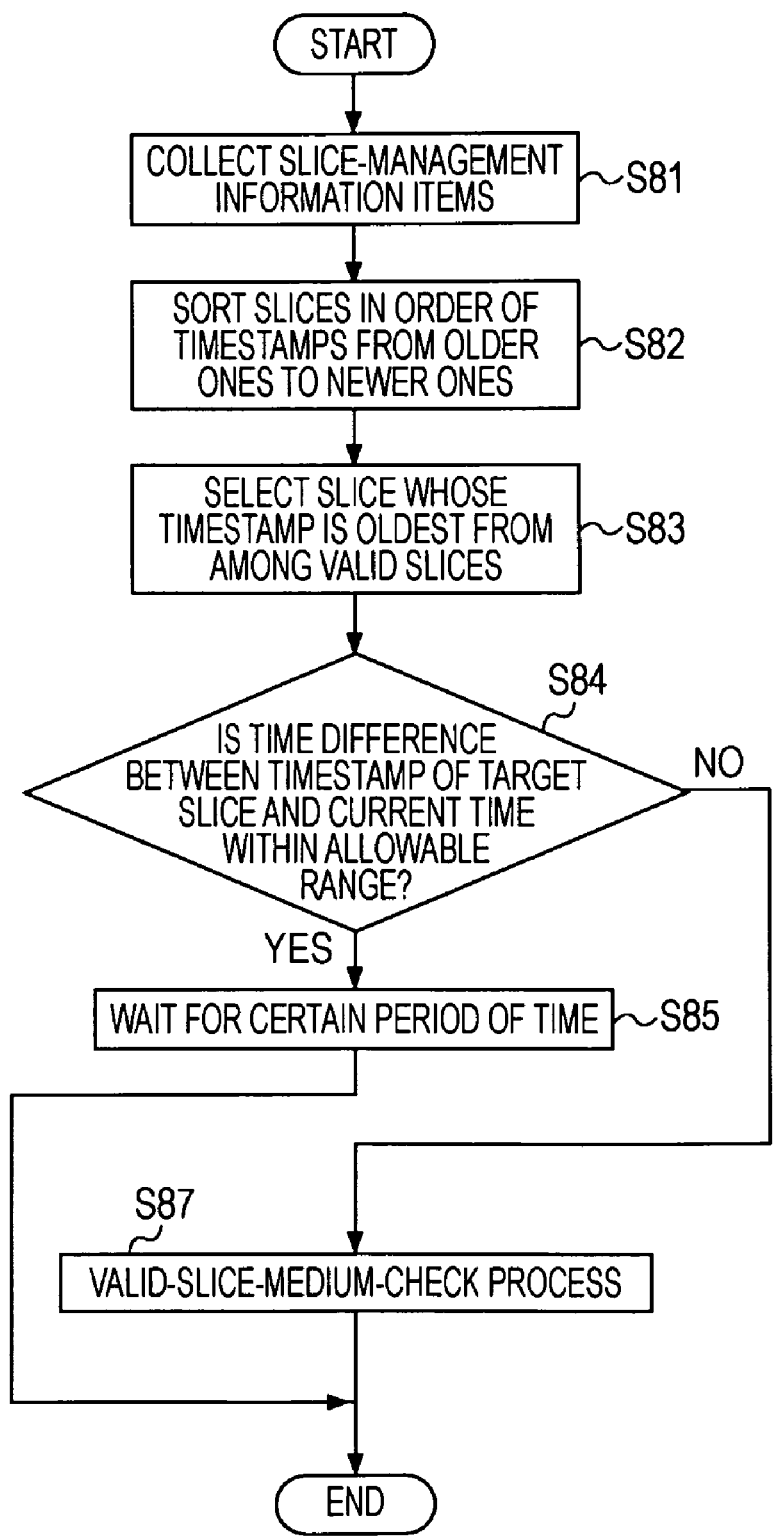
FIG. 13 is a flowchart illustrating a patrol process performed by the CP according to an embodiment in a case in which data protection is assigned a higher priority.

FIG. 13 is a flowchart of a patrol process performed by the CP according to an embodiment in a case in which data protection is assigned a higher priority, showing the patrol process as an example. First, the all-slice-management-information collection unit 73 collects slice-management information items from all of the DPs 54 (S81). Next, the all-slice-management-information operation unit 74 sorts slices in order of timestamps from older ones to newer ones (S82). A slice whose timestamp is the oldest is selected as a target slice from among all of valid slices (S83). Then, the all-slice-management-information operation unit 74 determines whether or not the time difference between the timestamp of the target slice and the current time is within a predetermined allowable range (S84).

When the time difference is within the allowable range (Yes in S84), the all-slice-management-information operation unit 74 waits for a certain period of time (S85), and the patrol process ends.

When the time difference is not within the allowable range (No in S84), the valid-slice-medium-check process (S87) is performed on the target slice, and the patrol process ends. After that, the CP 53 starts the patrol process again.

The valid-slice-medium-check process is as described above.

In the patrol process in a case in which data protection is assigned a higher priority, a slice whose timestamp is the oldest is selected as the target slice from among all of the valid slices. Accordingly, time intervals of patrol processes can be continuously equalized for all of the valid slices. In other words, all of the valid slices can be prevented from being in a state in which no patrol process is performed for a long period time.

Additionally, in the embodiment, when the target slice is a valid slice, the slice-data-copy process is performed, whereby the patrol operation can be performed on both the valid slice from which the data item is copied and the invalid slice to which the data item is copied.

When access to an entire slice is completed, a timestamp of the slice is updated. The target slice is selected in accordance with timestamps. Accordingly, access to an entire slice is equivalent to performance of the patrol operation on the slice, and performance of the patrol operation on the slice can be assigned a lower priority.

Furthermore, even when the target slice is a primary slice, the types of slices are swapped in such a manner that the primary slice becomes the secondary slice and that the secondary slice becomes the primary slice, and the data item of the secondary slice is always copied to the reserve slice. The data item is read from the primary slice, whereby reading of the data item is performed. Accordingly, degradation of read characteristics due to the patrol process can be avoided.

In addition, when the target slice is an invalid slice, slice-data initialization is performed on the target slice, whereby the target slice can be inspected. When the target slice is a valid slice, slice data is copied from the target slice to the reserve slice, which is one of the valid slices, whereby both the target slice and the reserve slice can be inspected.

Operations S31 and S81 in the embodiment serve as collecting operations. Operations S33 and S83 in the embodiment serve as determination operations. Operations S63, S64, and S41 in the embodiment serve as instruction operations.

The all-slice-management-information collection unit in the embodiment serves as a collection unit. The all-slice-management-information operation unit in the embodiment serves as a determination unit. The slice-data-copy instruction unit and the slice-data-initialization instruction unit in the embodiment serve as instruction units.

Furthermore, a program causing a computer communicating a storage-management apparatus to perform the above-described operations may be provided as a storage-management program. The program is stored in a recording medium that can be read by the computer, and is executed by the computer configuring a storage-management apparatus. Examples of the recording medium that can be read by the computer include an internal storage device that is implemented in the computer, such as a read-only memory (ROM) or a random-access memory (RAM), a compact-disk read-only memory (CD-ROM), a flexible disk, a digital versatile disk (DVD), a magneto-optical disk, a mobile storage medium, such as an integrated circuit (IC) card, a database in which the computer program is maintained, another computer, a database of another computer, and a transmission medium provided on a line.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-readable storage medium in which a storage-management program is recorded, the storage-management program causing a computer to perform a management process for managing a plurality of storage areas, comprising:

collecting valid-area-determination information items and timestamp information items, each of the valid-area-determination information items showing whether a corresponding one of the plurality of storage areas is one of valid areas in which data is stored or one of invalid areas in which data is not stored, each of the timestamp information items showing that an entire of a corresponding one of the plurality of storage areas has been accessed;

copying, in accordance with the valid-area-determination information items and the timestamp information items, data from a storage area which is selected from among the valid areas and whose timestamp information item is oldest to a storage area which is selected from among the invalid areas and whose timestamp information item is oldest; and updating a timestamp information item concerning the storage area from which the data is copied and a timestamp information item concerning the storage area to which the data is copied, updating a valid-area-determination information item concerning the storage area from which the data is copied to an information item showing that the storage area is an invalid area, and updating a valid-area-determination information item concerning the storage area to which the data is copied to an information item showing that the storage area is a valid area.

2. The computer-readable storage medium according to claim 1, comprising:

implementing a data-redundancy configuration in such a manner that storage areas having valid-area-determination information items showing that the storage areas are valid areas are classified as pairs of main areas and sub-areas, the sub-areas being different from the main areas and being indicated as valid areas.

3. The computer-readable storage medium according to claim 2, wherein data is read from any one of the main areas in response to a request from an external unit, and wherein when the storage area from which the data is copied is one of the main areas selected from among the storage areas having the data-redundancy configuration, the storage area from which the data is copied to a sub-area is updated, and a storage area that is paired with the storage area from which the data is copied is set as a main area.

4. The computer-readable storage medium according to claim 1, wherein when copying in accordance with the valid-area-determination information items, when none of the plurality of storage areas is a valid area, an initialization process of initializing a storage area whose timestamp information item is oldest is performed.

5. A storage-management apparatus that performs a management process for managing a plurality of storage areas, the storage-management apparatus comprising:

a collecting unit configured to collect valid-area-determination information items and timestamp information items, each of the valid-area-determination information items showing whether a corresponding one of the plurality of storage areas is one of valid areas in which data is stored or one of invalid areas in which data is not stored, each of the timestamp information items showing that an entire of a corresponding one of the plurality of storage areas has been accessed; and a data-copy unit configured to copy, in accordance with the valid-area-determination information items and the timestamp information items, data from a storage area which is selected from among the valid areas and whose timestamp information item is oldest to a storage area which is selected from among the invalid areas and whose timestamp information item is oldest, and wherein the data-copy unit updates a timestamp information item concerning the storage area from which the data is copied and a timestamp information item concerning the storage area to which the data is copied, updates a valid-area-determination information item concerning the storage area from which the data is copied to an information item showing that the storage area is an invalid area, and updates a valid-area-determination information item concerning the storage area to which the data is copied to an information item showing that the storage area is a valid area.

6. The storage-management apparatus according to claim 5, comprising:

a data-redundancy-configuration-making unit configured to make a data-redundancy configuration in such a manner that storage areas having valid-area-determination information items showing that the storage areas are valid areas are classified as pairs of main areas and sub-areas, the sub-areas being different from the main areas and being indicated as valid areas.

7. The storage-management apparatus according to claim 6, wherein data is read from any one of the main areas in response to a request from an external unit, and wherein, when the storage area from which the data is copied is one of the main areas selected from among the storage areas having the data-redundancy configuration, the data-copy unit updates the storage area from which the data is copied to a sub-area, and sets a storage area that is paired with the storage area from which the data is copied as a main area.

8. The storage-management apparatus according to claim 5, wherein, in accordance with the valid-area-determination information items, when none of the plurality of storage areas is a valid area, the data-copy unit performs an initialization process of initializing a storage area whose timestamp information item is oldest.

9. The storage-management apparatus according to claim 5, wherein the plurality of storage areas have the same size of storage area.

10. A storage-management method for performing a management process on a plurality of storage areas, the storage-management method comprising:

collecting valid-area-determination information items and timestamp information items, each of the valid-area-determination information items showing whether a corresponding one of the plurality of storage areas is one of valid areas in which data is stored or one of invalid areas in which data is not stored, each of the timestamp information items showing that an entire of a corresponding one of the plurality of storage areas has been accessed;

copying, in accordance with the valid-area-determination information items and the timestamp information items, data from a storage area which is selected from among the valid areas and whose timestamp information item is oldest to a storage area which is selected from among the invalid areas and whose timestamp information item is oldest; and updating a timestamp information item concerning the storage area from which the data is copied and a timestamp information item concerning the storage area to which the data is copied, updating a valid-area-determination information item concerning the storage area from which the data is copied to an information item showing that the storage area is an invalid area, and updating a valid-area-determination information item concerning the storage area to which the data is copied to an information item showing that the storage area is a valid area.

11. The storage-management method according to claim 10, comprising:

implementing a data-redundancy configuration in such a manner that storage areas having valid-area-determination information items showing that the storage areas are valid areas are classified as pairs of main areas and sub-areas, the sub-areas being different from the main areas and being indicated as valid areas.

12. The storage-management method according to claim 11, wherein data is read from any one of the main areas in response to a request from an external unit, and wherein when the storage area from which the data is copied is one of the main areas selected from among the storage areas having the data-redundancy configuration, the storage area from which the data is copied is updated to a sub-area, and a storage area that is paired with the storage area from which the data is copied is set as a main area.

13. The storage-management method according to claim 10, wherein when copying in accordance with the valid-area-determination information items, when none of the plurality of storage areas is a valid area, an initialization process is performed in which a storage area whose timestamp information item is oldest is initialized.

* * * * *